E. H. HUNT.
CUTTER HEAD.
APPLICATION FILED AUG. 8, 1919.
1,365,496.
Patented Jan. 11, 1921.
2 SHEETS—SHEET 1.
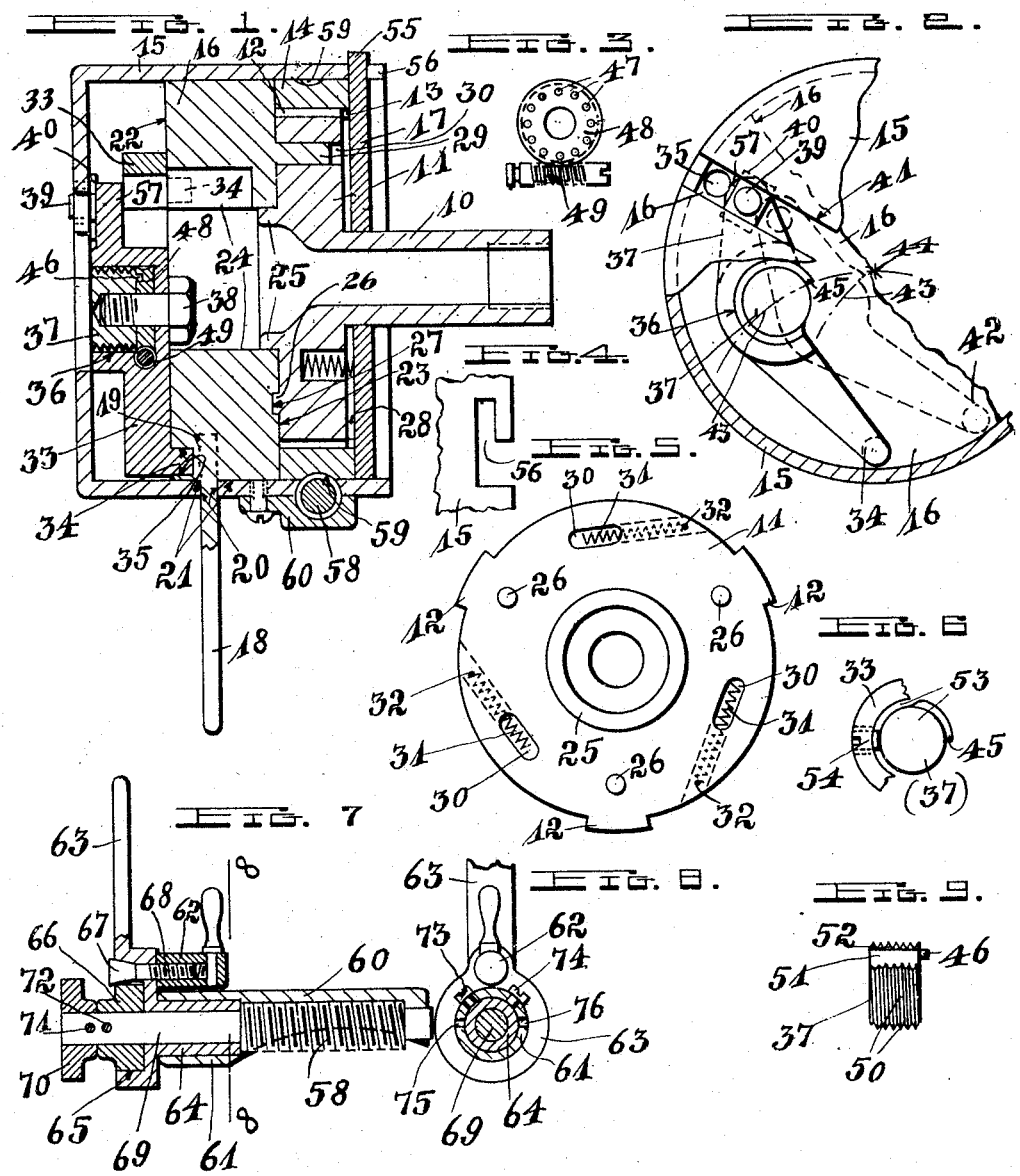

E. H. HUNT.
CUTTER HEAD.
APPLICATION FILED AUG. 8, 1919.

1,365,496.

Patented Jan. 11, 1921.
2 SHEETS—SHEET 2.

INVENTOR:
Elijah H. Hunt

UNITED STATES PATENT OFFICE.

ELIJAH H. HUNT, OF LOS ANGELES, CALIFORNIA.

CUTTER-HEAD.

1,365,496.  Specification of Letters Patent.  Patented Jan. 11, 1921.

Application filed August 8, 1919. Serial No. 316,249.

*To all whom it may concern:*

Be it known that I, ELIJAH H. HUNT, a citizen of the United States, residing at Los Angeles, in the county of Los Angeles and State of California, have invented a new and useful Cutter-Head, of which the following is a specification.

This invention relates to tools for holding thread-cutting members in a head for turrets or screw machines.

One object of this invention is to provide a simple easily operating tool.

Another object is to provide a tool which allows an advantageously large variation in the diameter of the screws to be cut with the same tool.

Another object is to provide a tool with means for rough and finish cutting by an easily operated release which insures a distinctly perfect finish.

Another object is to provide chasers with a common thread having a suitable projection by which all chasers in a certain set or tool can be correctly reground.

Another object is to provide a fine adjustment between the chasers and the holders for cutting in steel, or bronze, or any other material, which may require a different setting of the cutting edge on the chasers, advanced in relation to the center of the material or retarded, as the case may require.

Another object is to provide a closed tool into which no chips can enter as concerns the adjusting mechanism and parts of especially sensitive condition.

Another object is to provide an automatic release from the threads on the finished material.

Other objects will appear from the following description and appended claims as well as from the accompanying drawing, in which—

Figure 1 is a longitudinal mid-section of the device.

Fig. 2 is a front elevation of one of the cutting jaws in operating position, a partly sectional and partly in front elevation illustrated portion of the housing is shown with the jaw.

Fig. 3 is a front elevation of the adjusting means for the cutting chasers.

Fig. 4 is a fragmentary side elevation of the locking member in the housing.

Fig. 5 is a front elevation of the body on and around which the several parts of the head are mounted.

Fig. 6 is a front elevation of a cutting chaser, illustrated in a rather used up condition in which the chaser-holder normally would not tightly inclose or hold such chaser without a screw illustrated in this figure.

Fig. 7 is a longitudinal mid-sectional view of the adjusting mechanism for setting the chasers for different diameters in the material to be cut.

Fig. 8 is a cross section on line 8—8 of Fig. 7.

Fig. 9 is a side elevation of a cutting chaser.

Figure 10:
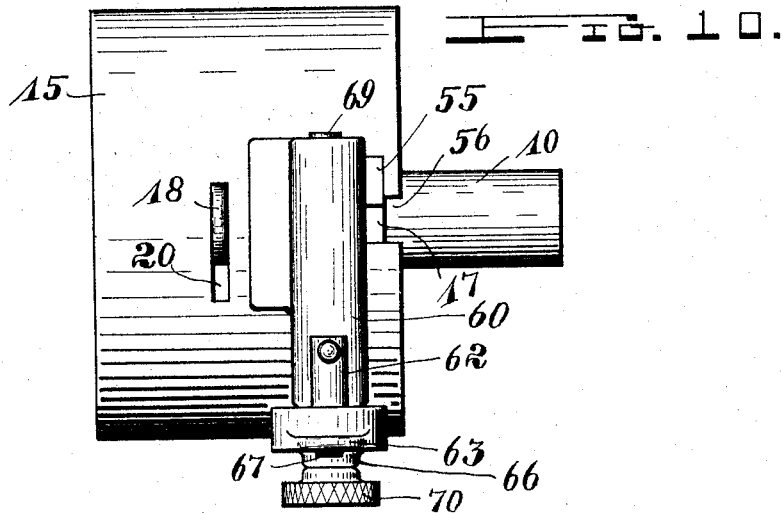
Fig. 10 is a side elevation of the device.
Figure 11:
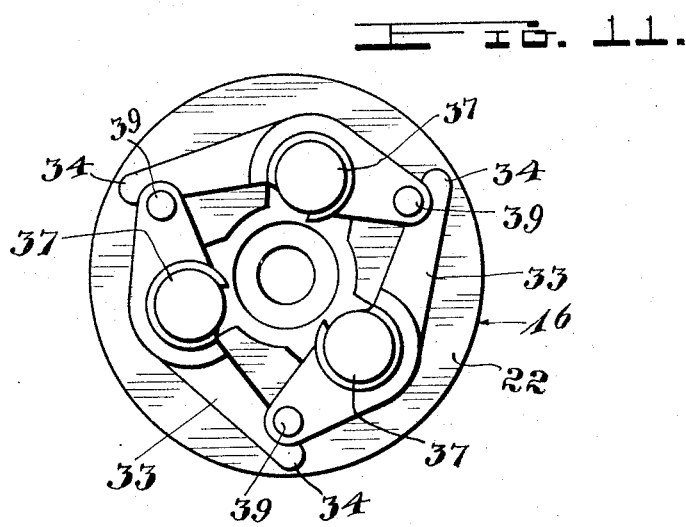
Fig. 11 is a front elevation of the device having the inclosing cap removed.

In Fig. 1, 10 designates the body or stock on which and around which all the other parts are assembled, and which forms so to say the holder by which this device is mounted or held on the machine or place where it is used. This stock is provided with a head 11. A suitable number of jaws or coupling members 12 are provided on the head 11, see also Fig. 5, to slidingly engage with correspondingly shaped recesses 13 in the ring 14. This ring 14 is loosely inserted into the cap 15, turnably held in position between the setting ring 16 and the cover plate 17 within the cap 15. The setting ring 16 is turnably held in its position within the cap by its handle 18, said handle being press-fit inserted into the ring 16, for which purpose a suitable recess 19 is provided in the setting ring 16. The ring 16 is naturally first inserted into the cap 15 and then the handle 18 driven tightly into the recess 19 in the ring through the slot 20 in the cap. The ring 16, being by its rather long bearing surface 21 prevented from tipping within the bore or hollow of the cap, and being prevented from shifting in longitudinal relation to the cap, forms thus a turnably moving center body with a front face 22 and a rear face 23. The cutting mechanism of the device is mounted on the front face 22 of the center body, while the setting and adjusting mechanism is mounted on the rear face of the center body. A suitable bore 24 is provided through the center of the center body. The stock 10 is provided with a corresponding extension or projection 25 turnably fitting in the center bore of the center body 16.

Such tight fitting of the extension of the stock in the bore of the center body prevents any chips or waste from getting behind the center body into the fine adjustments, located between the center body and the closure plate 17.

The pins or projections 26, see Fig. 5, on the front face of the stock 10, are made to fit into the recesses 27 in the rear face of the center body, see Fig. 1. The length of such projections 26 is equal to or slightly shorter than the space 28, between the rear face of the head 11 and the inner side of the cover plate 17, so that, by a disengaging of the projections 26 out of the recesses 27, the head 11 may freely turn a suitable extent between the center body and the closure plate, as will be understood from the description later on. The center body is also provided with projections or pins, as indicated at 29, see Fig. 1, to project into the elongated recesses or perforations 30, see Fig. 5.

Such recesses or perforations 30 are made of such length to allow, by a disengaging of the projections 26, the turning of center body 16, to which the cutting mechanism is attached as will be understood from the description later on, to such an extent in relation to the adjusting mechanism and the cap inclosing the same, as is required to take the cutting members out of the threads on the material on which this device is used.

To make the disengaging of the threading members automatic, the springs 31 are disposed in suitable bores terminating in the elongated recesses or perforation 30 in the head of the stock 10 so as to automatically move the pins or projections 29 from one to the other end of the elongated recesses or perforations, the pins 29 being in normal position located so as to compress the springs 31, that is the position in which the pins 26 engage within the recesses 27, the springs 31 being held in position in the bore by the small pins 32.

Such engaging of the projections 26 of the stock 10 with the setting ring or center body occurs during the thread-cutting operation.

The slot 20 in the cap for the handle 18 on the setting ring is naturally made of suitable length to allow the turning of the setting ring within the cap.

The cutting mechanism is mounted on the swinging arm 33, which is provided with a pin-end 34, pivotally and swingably engaging in a recess 35 in the front face 22 of the center body or setting ring 16. Such swinging arms can naturally be provided in any suitable number in a device, and a corresponding number of recesses 35 can, of course, also be provided in the front face 22 of the setting ring 16. The main body of the swinging arms are provided with recesses 36 for the cutting chasers 37, which are tightly held in position by the screws 38. On the free ends, beyond the recess 36, the swinging arms are provided with the pins 39, which by means of a fulcrum 40 are slidingly mounted in the radial slots 41 in the cap 15, see Fig. 2.

In considering the Figs. 1 and 2, it will easily be understood that, by a turning of the setting ring 16 within the cap 15, the pivot ends 34 of the swinging arms 33 can be moved to a position indicated in dotted lines at 42, making the free ends with the pin 39 and fulcrum 40 slide in the radial slot 41 toward the center of the device as indicated in the dotted lines. Such a turning and moving provides for a rather great variety in the diameter of the material to be cut, as will easily be understood from the illustration in Fig. 2. The centers of the thread cutting chasers are located in a circle, indicated at 43, running through the center 44 of the device, so that the cutting points or edges 45 of the cutting chasers are always in the same radial relation to the material to be cut, no matter what the diameter of the material, as will easily be understood from the above description and the illustrations in Figs. 1 and 2.

The illustration of the swinging arm 33, moved to its innermost or centermost position indicated in dotted lines at 42, clearly shows the cutting points or edges 45 in the direction toward the center 44. The points or edges 45 are naturally undercut to a certain extent when considered in relation to the circle 43 and the center of the chasers 37. The pivot ends 34 naturally maintain the same distance from the center 44 of the whole device no matter how otherwise moved, thereby only too naturally producing such a swinging of the center of the chasers along or in the circle 43, as described above.

For cutting threads in different materials, for instance—in steel, or brass, or cast-iron, etc., the cutting edges of the cutting chasers should naturally be advanced or retarded to properly cut clean threads, as will be known by any mechanic, this is accomplished by the adjusting means illustrated in Fig. 3, also shown in proper position in cross sectional view in Fig. 1, inserted below the chasers within the recess 36 in the swinging arms 33. The chasers 37 are for this purpose provided with small pins 46 to engage in the perforations or recesses 47 in the small worm gears 48. The worm gears engage with the worms 49, one for each of the chasers in the device. On loosening the screw 38, the chasers can easily be set and adjusted very accurately by the worms and worm gears, and, after such setting the chasers can again be tightly clamped within the swinging arms 33 by the screws.

The chasers are preferably made with normal threads 50 as any common screw with a desired thread, partly removed, preferably by grinding as indicated at 51 to form the sharp cutting points or edges 52, as illustrated in Fig. 9. Such cutting edges naturally have to be reground whenever dull, and the chasers may become to look something like the chaser 53, illustrated in Fig. 6, leaving a space within the recess in the swinging arms 33. The chasers are in such condition naturally just as well tightly held in position by the screws 38, but excessive pressure may bend the chasers off. To prevent this, the screws 54 are provided in the chasers, taking up the excessive back pressure.

The closure plate 17 is provided with a suitable number of projections or thumb pieces 55, see Fig. 1, to engage within the engaging means 56, illustrated in Fig. 4. The cover plate 17 is naturally placed into its position by disposing the projections 55 on the cover plate through the opening in the engaging means 56 from the open end of the cap, and a short turn of the cover plate naturally brings the cover plate in engagement with the cap 15 with the projections 55 within the engaging means 56 on the open end of the cap.

The swinging arms for the cutting chasers are preferably constructed as illustrated in Figs. 1 and 2, with the main arm 33 pivotally connected to the center body 16 and the free end 57 forming the counteracting and supporting arm. From the illustrations in these two figures, it will easily be understood that the free end or counteracting arms 57 are to swing below or behind the main arm 33, the pivot-end 34 of the one swinging arm being shown in its engaging position with the center body 16, in front view in Fig. 2, while a recess 35 is shown close to the free end 57 so as to make it understood that a second swinging arm to be engaging in this recess 35 would naturally have to swing below or behind the free end 57. With reference to Fig. 1, the pivot-end 34 is illustrated as engaging within the recess 35 of the center body 16, so shaped and constructed as to leave a space between the arm 33 and the front cover plate 15. The front ends 57 of such swinging arms naturally move in a radial direction from a point near the center of the whole device as illustrated in dotted lines at 42 in Fig. 2 to a point eventually near the outer periphery, since guided in the radial slots 41. Near the periphery, however, are the several recesses 35 in the center body or setting ring 16 to be engaged by the pivot-ends of the several swinging arms. It stands to reason, then, that the swinging arms must be shaped and constructed so that the free ends or counteracting arms 57 can swing past the pivotally engaged ends 33 of the next nearest swinging arms, that is—one free end or counteracting arm 57 always is in a position that it can pass over or past the arm 33 of the next following swinging arm. Referring, then, again to Fig. 1, it will then easily be understood that the free end or counteracting arm 57 is designed so that it does not take any more room than is provided between the next swinging arm 33 and the front cover 15, when comparing with the space between the arm 33 and the front plate 15 of the same swinging arm in that Fig. 1. Bringing the free end 57, being called the counteracting arm, thus rather far to the front end of the chasers and of the device as a whole, has the further advantage that the main pressure in cutting threads is taken up right at the front end, giving the main support to the chasers right there where it is required in cutting threads, as will easily be understood, preventing a taper cutting, which would eventually be possible if the free ends or counteracting arms 57 would be in alinement with the pivotally engaged ends 33 close to the center body or setting ring 16 so that the center portion of all such swinging arms could be influenced in such a manner by the chasers held in the front face of such arms.

The adjusting mechanism illustrated in Fig. 7 is operating and operated in conjunction with the ring 14 in Fig. 1.

The worm 58 is in engagement with the worm gear 59, provided in the periphery of the ring 14. The box 60 inclosing the worm and holding the worm in its position, is secured to the cap 15, having a practically round extension 61, so as to allow the swinging around of the locking nut 62 to a suitable extent free of the cap. The lever 63 is provided with a sleeve extension 64 turnably fitting in a suitable recess in the box 60. The front face of the lever, opposite to the sleeve extension 64, is provided with a recess 65 for the locking ring 66, turnably fitting in the recess 65. Disposed through the lever near the locking ring 66 is a locking pin 67, having a threaded stem 68 to engage with the locking nut 62. The shaft 69 carries the extension sleeve 64, in which it turns, and also carries the locking ring 66 and the thumb button 70, the ring 66 and the button 70 being secured to the shaft 69 by the pins 71 and 72.

Turning the worm 58, being in engagement with the adjustment-ring 14, naturally causes an adjustment of the thread cutting mechanism as to the diameter of the material to be cut, taking reference to the description above; since the adjustment ring 14 engages with the head 11 of the stock, the head 11 engaging with center body 16 by the pins 26 and the recesses 27, and the center-body turning within the cap 15 thereby shifting the swinging arms to positions as illustrated in Fig. 2. In any adjusted position, the center-body is still able to swing a suitable distance to disengage the thread cutting members from the threads cut on any material, as soon as the short pins 26 on the head 11 disengage from the recesses 27 in the center body, allowing the pins 29 to move within the elongated recesses or perforations 30 in the head 11. Such disengaging of the short pins 26 from the recesses 27 occurs in the usual manner as known with turret machines, whenever the turret has reached a certain stop on the machine on which such tools are used.

From the above it will be understood that a turning of the worm produces a different diameter in the cutting of threads, this is utilized for cutting rough and finished cuts. The worm 58, having the shaft 69, by which it is turned, is locked within the lever 63 by the taper locking pin 67, wedging between the lever and the locking ring 66. In such locked condition, the worm can naturally only be turned as far as the lever 63 can be swung, and the movement of this lever 63 is limited by the locking nut 62, coming in engagement with either, the nut or pin 73 or 74, on the round extension 61. It is now constructed and designed that, when the locking nut 62 is in position to produce a rough cut in the thread cutting members, by resting against the pin 73, for instance, the lever will produce a setting for finish cut in the threading members when the locking nut rests against the pin 74. Such positions may, of course, be reversed, depending on the directions of the threads on the worm 58. Extra holes 75 and 76, and any suitable number besides these, may easily be provided in the extension or any other suitable place, as illustrated in Fig. 8, allowing for a different range in the rough and finish cut, as will easily be understood.

Having thus described my invention, I claim:

1. A cutter head comprising a stock with a head thereon, a center body having means for engagement with the stock, cutter-holders swingably engaging on the front face with the center-body, a cap disposed to inclose the several parts, and an adjustment mechanism inserted between the stock and the cap for adjustment of the cutter holders for varying diameters to be cut with the same device.

2. A cutter head comprising a stock having engaging means on its front face, a center body having means for engagement with the engaging means on the stock, the stock having also a projection for closing the rear of the device in which the adjustment mechanism is located from the front of the center body on which the thread cutting members are located for preventing chips and other waste from influencing the adjustment of the device, cutter holders swingably engaging on the front face with the center body, a cap disposed to inclose the several parts, and an adjustment mechanism inserted between the stock and the cap for adjustment of the cutter holders for varying diameters to be cut with the same device.

3. A cutter holder for cutter heads of screw-cutting machines provided with a pin in relation to which the holder forms a swinging arm, a cylindrical recess being provided for a cutter chaser in one side of the arm crosswise to the swinging movement and parallel to axis of the pin around which the arm swings.

4. A cutter holder for cutter heads of screw-cutting machines provided with a swinging arm, the one end of the arm having means for swingably supporting and connecting the arm, the main body of the arm having a recess from the front face to a suitable depth toward the rear, the axis of the recess being parallel to the axis of the swinging movement of the arm, and means for holding cutters within the recess.

5. A cutter holder for cutter heads of screw-cutting machines provided with a swinging arm, the one end of the swinging arm having means for swingably supporting and connecting the arm, the main body of the arm having a recess extending from the front face to a suitable depth toward the rear, the axis of the recess being parallel to the axis of the swinging movement of the arm, the arm having an extension beyond the main body on the free end of the swinging arm near the front face for taking up excessive pressure which is usually applied to the front of such devices, the recess being of a shape to hold cylindrical cutters with the axis of the cutters parallel to the swinging movement of the swinging arm.

6. In combination with a cutter holder for cutter heads of screw cutting machines having a cylindrical recess, a cutter with the general outline of a cylindrical body removably fitting in the recess of the holder, the rear end of the cutter having a pin to engage with the holder in cutting position, and means for tightly holding the cutter in cutting position within the holder.

7. In combination with a cutter holder for cutter heads of screw cutting machines having a cylindrical recess, and a cutter with the general outline of a cylindrical body removably fitting in the recess of the holder, of a worm-gear disposed in the recess of the holder below the cutter having means to engage with the cutter, and a worm engaging with the worm gear for adjusting the cutting position of the cutter within the holder.

8. In a cutter head of the class described, an adjusting-ring having a worm gear provided thereon and having a worm engaging with the ring, the worm having a shaft projecting out of the head, a handle mounted on the shaft in turnable relation to the shaft, a locking means disposed between the handle and the shaft, and a suitable number of stops on the outside of the head near the handle for allowing a setting of the handle and thereby of the adjusting ring for a rough and finished cut adjustment of the cutters in the head.

In testimony that I claim the foregoing as my invention I have signed my name in the presence of two subscribing witnesses.

ELIJAH H. HUNT.

Witnesses:
THOMAS J. NASH,
JOHN H. PRATT.